United States Patent
San Martin et al.

(10) Patent No.: US 8,299,796 B2
(45) Date of Patent: Oct. 30, 2012

(54) HIGH RESOLUTION VOLTAGE SENSING ARRAY

(75) Inventors: Luis E. San Martin, Houston, TX (US); Evan L. Davies, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 414 days.

(21) Appl. No.: 12/600,501

(22) PCT Filed: May 21, 2007

(86) PCT No.: PCT/US2007/012086
§ 371 (c)(1),
(2), (4) Date: Nov. 17, 2009

(87) PCT Pub. No.: WO2008/143616
PCT Pub. Date: Nov. 27, 2008

(65) Prior Publication Data
US 2010/0148788 A1    Jun. 17, 2010

(51) Int. Cl.
*G01V 3/00* (2006.01)
(52) U.S. Cl. ........ 324/366; 324/303; 324/347; 324/355; 324/367
(58) Field of Classification Search ........... 324/323–375
See application file for complete search history.

(56) References Cited

U.S. PATENT DOCUMENTS

| | | | |
|---|---|---|---|
| 4,412,180 A | 10/1983 | Desbrandes | |
| 4,468,623 A | 8/1984 | Gianzero et al. | |
| 7,242,194 B2 | 7/2007 | Hayman et al. | |
| 2003/0057950 A1 | 3/2003 | Gao et al. | |
| 2003/0122547 A1 * | 7/2003 | Prammer | 324/368 |
| 2004/0245991 A1 | 12/2004 | Hayman et al. | |
| 2007/0046291 A1 * | 3/2007 | Itskovich | 324/367 |
| 2007/0103162 A1 | 5/2007 | Morys et al. | |
| 2010/0148788 A1 | 6/2010 | San Martin et al. | |

FOREIGN PATENT DOCUMENTS

CN    1267781    9/2000

OTHER PUBLICATIONS

PCT Int'l Search Report and Written Opinion, dated Apr. 29, 2009, Appl No. PCT/US07/12086, "High Resolution Voltage Sensing Array", filed May 21, 2007, 8 pgs.
PCT International Preliminary Report on Patentability and Written Report, dated Dec. 3, 2009, Appl No. PCT/US2007/012086, "High Resolution Voltage Sensing Array", filed May 21, 2007, pp. 1-6.
First Chinese Office Action, dated Dec. 29, 2011, Appl No. 200780053046.8, "High Resolution Voltage Sensing Array", filed May 21, 2007, 9 pgs.
Supplementary European Search Report, dated Apr. 3, 2012, Appl No. 07795118.4, "High Resolution Voltage Sensing Array", 6 pgs.

* cited by examiner

*Primary Examiner* — Jermele M Hollington
*Assistant Examiner* — Son Le
(74) *Attorney, Agent, or Firm* — Krueger Iselin LLP

(57) ABSTRACT

An apparatus and method for performing high transverse resolution voltage measurements in downhole logging tools utilized to determine the resistivity of an adjacent portion of a borehole wall. Two current electrodes 508 and 509 are energized by an excitation source to create an oscillatory electric field in a borehole wall. The voltage drop from each voltage electrode in a row of laterally spaced voltage electrodes 604 is measured relative to a shared voltage electrode 606 longitudinally spaced from the row of electrodes. The differential voltage is used in combination with a measured current flow to determine a resistivity value for the borehole. A second row of laterally spaced voltage electrodes 608 having electrodes laterally offset from the electrodes of the first row is included to provide high transverse resolution. A common mode voltage at the shared voltage electrodes is measured and utilized to minimize the resistivity measurement error.

21 Claims, 6 Drawing Sheets

HIGH RESOLUTION VOLTAGE SENSING ARRAY

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. However, oil-based muds can inhibit such measurements due to the variability of impedance in the mud surrounding the tool. U.S. Pat. No. 6,191,588 (Chen) discloses an imaging tool for use in oil-based muds. Chen's resistivity tool employs at least two pairs of voltage electrodes positioned on a non-conductive surface between a current source electrode and a current return electrode. At least in theory, the separation of voltage and current electrodes eliminates the oil-based mud's effect on voltage electrode measurements, enabling at least qualitative measurements of formation resistivity based on the injection of a current excitation signal and the subsequent measurement of the voltage drop across the formation. The voltage drop sensed between the voltage electrodes is amplified, conditioned, acquired, and used with a measured current flow to calculate an estimate of formation resistivity in front of the pad.

Because well drilling and production decisions are based, at least in part, on borehole images rendered from log data, those images must resolve borehole features with precision. Spatial resolution of micro-resistivity data produced by the logging tool is one constraint on the level of detail contained in the borehole image. The size and spacing of the tool's voltage electrodes governs the spatial resolution of the measurements provided by the tool. Existing micro-resistivity voltage electrode arrays employ sets of like shaped electrodes arranged parallel to one another. The distance between any two electrodes in this arrangement is absolutely limited to the diameter of the electrode. In practice, the electrode spacing is limited to distances greater than the diameter of the electrode to reduce inter-electrode capacitive coupling which increases as electrode spacing is decreased. Accordingly, the spatial resolution of existing micro-resistivity tools is limited.

BRIEF DESCRIPTION OF THE DRAWINGS

In the following detailed description, reference will be made to the accompanying drawings, in which.

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

DETAILED DESCRIPTION

Disclosed herein are various resistivity imaging methods and systems having high transverse spatial resolution in non-conductive fluids such as an oil-based mud. In some embodiments, disclosed logging systems include a logging tool in communication with surface computing facilities such as a personal computer, server, or digital signal processing board, or some other form of computing circuit. The logging tool is provided with a sensor array having voltage electrodes positioned between at least two current electrodes that inject an excitation signal into a borehole wall formation. Electronic amplifier circuits measure differential voltages of the voltage electrodes relative to a shared voltage electrode. The arrangement of the voltage electrodes results in high transverse resolution while reducing the effects of inter-electrode capacitive coupling occurring as the inter-electrode distance decreases.

Figures 1, 2:
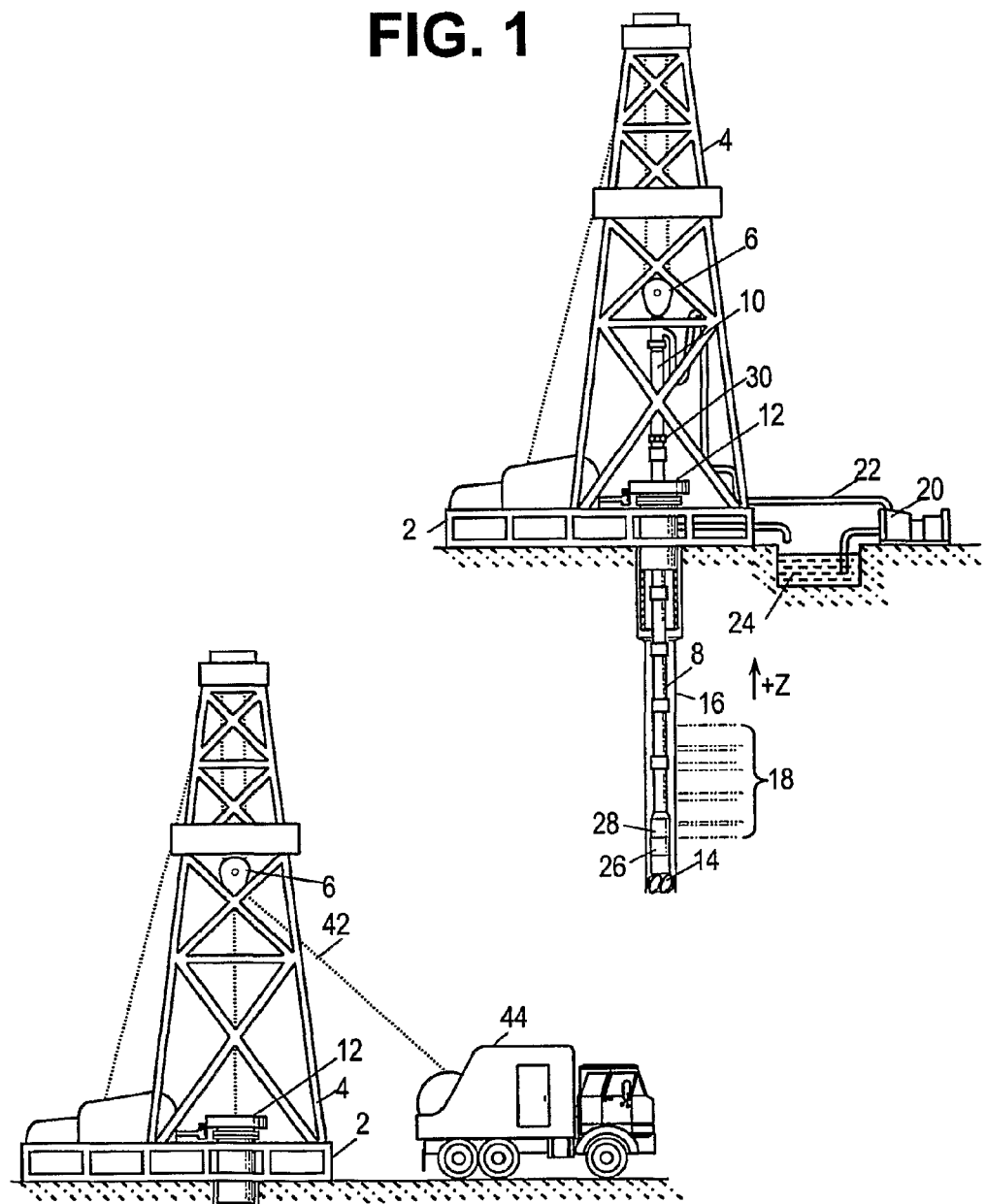
FIG. 1 shows an illustrative logging while drilling (LWD) environment.
FIG. 2 shows an illustrative wireline logging environment.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD resistivity imaging tool 26 is integrated into the bottom-hole assembly near the bit 14. As the bit extends the borehole through the formations, logging tool 26 collects measurements relating to various formation properties as well as the bit position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

At various times during the drilling process, the drill string 8 may be removed from the borehole. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

Figure 3:
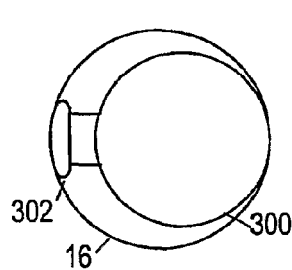
FIG. 3 shows an illustrative first logging tool configuration.

FIG. 3 shows a cross-sectional view of a wireline or LWD resistivity imaging tool 300 in a borehole 16. A biasing mechanism 302 de-centralizes tool 300 to minimize the standoff between the tool's sensors and the borehole wall. The tool's sensors may be located in a pad on biasing mechanism 302, or alternatively the sensors may be located in the main body of the tool opposite the biasing mechanism. As the tool 300 rotates and progresses along the borehole, the sensors will trace a helical path on the borehole wall. Orientation sensors within the tool may be used to associate the resistivity measurements with the sensors' positions on the borehole wall. Surface computing facilities may collect resistivity measurements, orientation (azimuth) measurements, and tool position measurements, and may process the collected measurements to create a resistivity image of the borehole wall.

Figure 4:
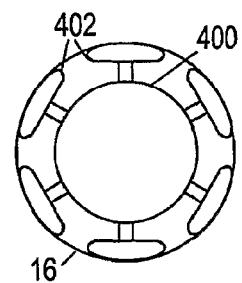
FIG. 4 shows an illustrative second logging tool configuration.

FIG. 4 shows a cross-sectional view of an alternative embodiment of a wireline or LWD resistivity imaging tool 400 in a borehole 16. Sensing pads 402 are deployed against the borehole wall to minimize standoff. Multiple pads may be used to obtain measurements over a greater fraction of the borehole's circumference. In some embodiments, the pads are provided in axially-offset groups to increase circumferential coverage without undue crowding in the undeployed configuration.

In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake," and it prevents intimate contact between logging sensors and uncontaminated formation material. In addition, motion of the logging instruments may create a fluid flow layer that further separates the logging sensors from the uncontaminated formation materials.

The mudcake and fluid flow layers have a very low conductivity, which creates some difficulty for high-resolution measurements of borehole wall resistivity. Measurements through the low-conductivity layers may be improved by, e.g., (1) using an alternating current, (2) increasing the distance between the voltage electrodes in order to increase the signal level, and (3) using a source current with a higher operating frequency to increase the capacitive coupling to the formation.

Figure 5:
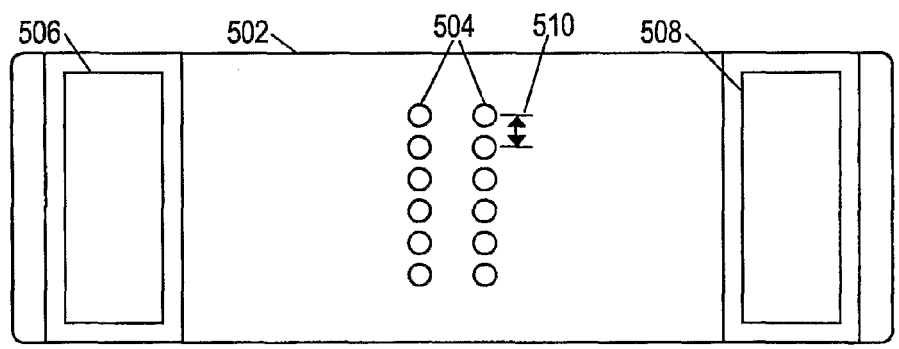
FIG. 5 shows a front view of an illustrative sensor pad having conventional voltage electrode arrangement.

FIG. 5 shows the face of an illustrative sensor pad 502 having six pairs of voltage electrodes 504 positioned between current electrodes 506 and 508. In practice, the sensor pads may be provided with additional voltage and current electrodes, and in fact may operate on multiple axes. With uniaxial sensor pads such as pad 502, the length of the sensor pad is kept parallel to the long axis of tool 34. The distance between the current electrodes 506, 508 controls the depth of investigation, with greater distances providing greater depths of investigation. The distances between the voltage electrodes 504 control the spatial resolution of the tool, with smaller distances providing higher resolutions.

The transverse resolution of sensor pad 502 is limited by the lateral spacing 510 of voltage electrodes 504. Decreasing the lateral spacing of voltage electrodes 504 increases the lateral resolution of measurements derived from pad 502, and consequently improves the ability of pad 502 to resolve fine structure in the borehole formations. Unfortunately, when arranged in parallel rows, as are voltage electrodes 504, the spacing of individual electrodes is limited to the diameter of the individual electrode. Voltage electrodes have been found to have a minimum practical size due to the loss of signal-to-noise ratio that occurs with smaller electrode sizes. In practice the electrodes' spacing must be even greater than the diameter of the individual electrode in order to limit the inter-electrode capacitive coupling which occurs when the distance between electrodes is too small.

Figure 6A:
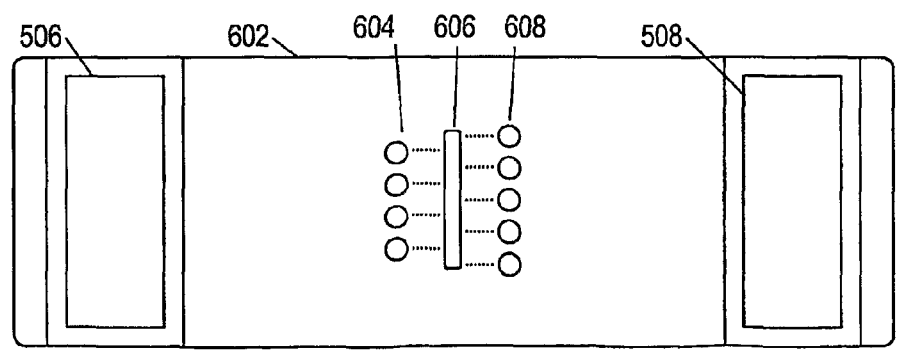
FIG. 6A shows a front view of an illustrative sensor pad featuring a high transverse resolution voltage electrode array.

FIG. 6A shows the face of an illustrative sensor pad 602 having an improved electrode arrangement in which two voltage electrode rows 604, 608, are separated by a shared electrode 606. In this embodiment, the arrangement of voltage electrodes 604, 606, and 608 is configured to improve lateral resolution. The voltage electrode array of pad 602 comprises a shared electrode 606, a first row of voltage electrodes 604 disposed to one side of shared electrode 606, and a second row of voltage electrodes 608 disposed to the opposite side of shared electrode 606. Shared electrode 606 serves as one voltage electrode of each voltage electrode pair formed with voltage electrodes 604 and 608. As illustrated, electrodes 604 and 608 are laterally offset enabling measurements of higher transverse resolution than are possible with the parallel arrangement of voltage electrodes 504 in FIG. 5. While the voltage electrodes 604 and 608 are illustrated as four and five electrodes respectively, no restriction on the number of electrodes is intended, and in practice, pad 602 may employ any number of voltage electrodes.

Figure 6B:
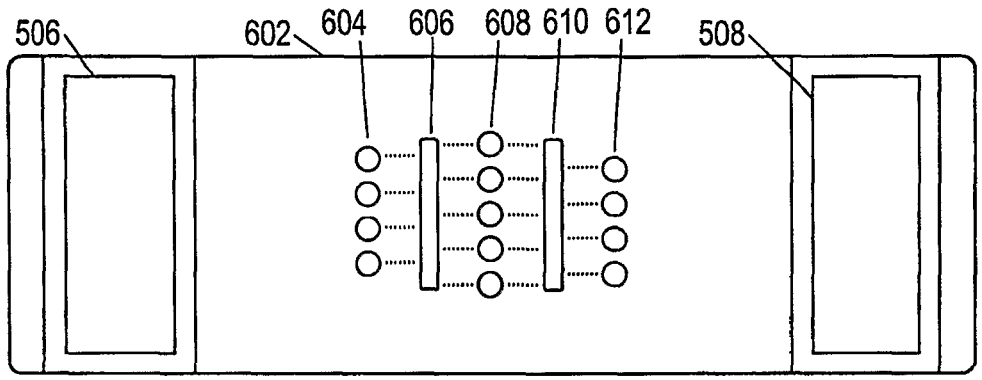
FIG. 6B shows a front view of an illustrative sensor pad featuring a high transverse resolution voltage electrode array employing multiple shared voltage electrodes.

Additionally, pad 602 may include multiple shared voltage electrodes and multiple rows of voltage electrodes. FIG. 6B shows illustrative sensor pad 602 in which voltage electrode rows 604, 608 are separated by shared electrode 606, and further including shared electrode 610 separating voltage electrode rows 608, 612. In this arrangement, voltage electrodes rows 604, 608, and 612 are laterally offset to obtain even higher lateral resolution than provided by the configuration of voltage electrodes 604, 606, and 608 illustrated in FIG. 6A.

As tool 34 traverses borehole 36, pad 602 is deployed against the borehole wall and voltage measurements indicative of formation resistivity are performed. The measurements associated with the voltage electrode pairs formed by voltage electrode 604 and shared electrode 606 are longitudinally offset from the measurements associated with the voltage electrode pairs formed by voltage electrode 608 and shared electrode 606. In order to realize high lateral resolution the measurements associated with the two sets of electrodes should be aligned or de-skewed. Alignment of two measurements may be accomplished by associating measurements taken from the voltage electrodes on one side of the shared electrode with measurements taken at the same longitudinal borehole position from the voltage electrodes on the opposite side of the shared electrode. Alternatively, measurements taken from voltage electrodes on either or both sides of the shared electrode may be interpolated to estimate the resistivity value at any longitudinal borehole position.

Figure 7:
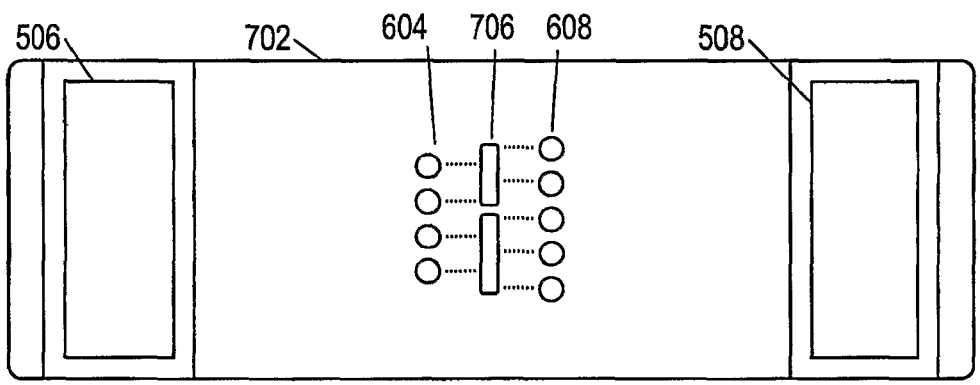
FIG. 7 shows a front view of an illustrative sensor pad featuring a high transverse resolution voltage electrode array employing a segmented shared voltage electrode.

FIG. 7 shows the face of a sensor pad 702 illustrating an alternative voltage electrode arrangement. In this arrangement, the shared voltage electrode 706 comprises two segments. As current electrodes 506 and 508 are energized to create an oscillatory electric field in the borehole wall, current generally flows longitudinally between current electrodes 506 and 508 through the borehole wall formations. However, localized non-homogeneity of the borehole wall formations may induce current flow lateral to pad 502. Under such conditions shared voltage electrode 606 provides a low resistivity current path transverse to pad 602. Because the voltage differences measured by voltage electrodes 604, 606, and 608 are created by longitudinal, rather than transverse current flow, any disturbances in current flow attributable to shared voltage electrode 606 should have only a minor effect on the voltage measurements. However, any minor effect shared voltage electrode 606 may have on the voltage measurements can be mitigated by breaking the transverse current path through the electrode by including segmented shared voltage electrode 706.

Figure 8:
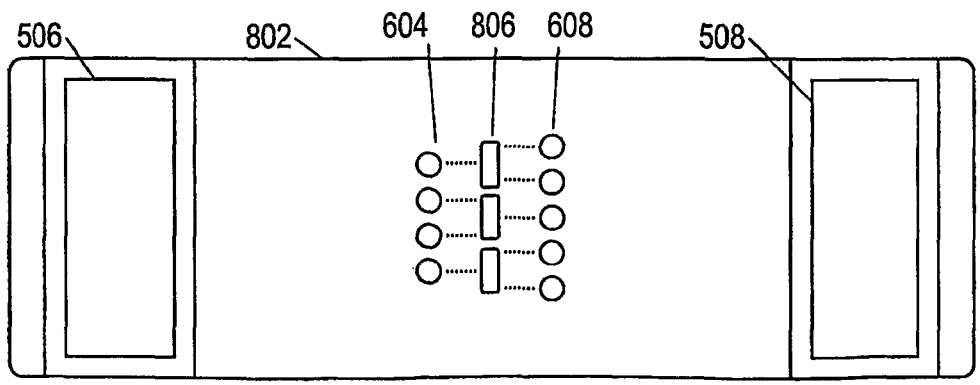
FIG. 8 shows a front view of an illustrative sensor pad featuring a high transverse resolution voltage sensor array employing a second embodiment of a segmented shared voltage electrode.

FIG. 8 shows the face of a sensor pad 802 illustrating a second alternative voltage electrode arrangement. In this arrangement, the shared voltage electrode 806 comprises three segments. Providing shared voltage electrode 806 as three segments further mitigates disturbances in transverse current flow while allowing high transverse resolution voltage measurements. Note that while three segments are illustrated, a variety of configurations are conceivable which employ an even greater number of segments. For example, as indicated by the dotted lines between voltage electrodes 604, 806, and 608, each of the three segments of shared voltage electrode 806 serves three voltage electrodes 604 or 608. An alternative embodiment of shared voltage electrode 806 comprises four segments, wherein three segments serve two voltage electrodes 604 or 608, and one segment serves three voltage electrodes 604 or 608. Yet another alternative embodiment of shared voltage electrode 806 comprises five segments wherein four segments serve two voltage electrodes 604 or 608, and one segment serves one voltage electrode 604 or 608. Numerous arrangements of shared voltage electrode 806 are possible for obtaining improved lateral resolution voltage measurements.

Figure 9:
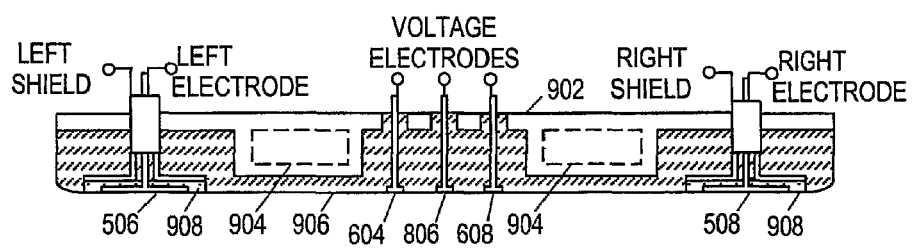
FIG. 9 shows a cross section of the illustrative sensor pad featuring a high transverse resolution voltage sensor array.

A cross-section of the illustrative sensor pad 802 is shown in FIG. 9. Sensor pad 802 comprises a metal substrate 902 to provide the pad with the needed rigidity and strength. The metal substrate 902 may include cavities 904 to hold sensor circuitry. For illustrative purposes, the electrode feeds are shown passing through the sensor pad 902, but the electrode feeds may alternatively connect to the sensor circuitry in cavities 904 or in a central cavity (not shown). In some embodiments, metal substrate 902 comprises steel. The face of metal substrate 902 is covered with an insulating layer 906, which in some embodiments comprises a polyetheretherketone (PEEK) material. Current electrodes 506 and 508 are embedded on the face of the insulating layer 906.

Figure 10:
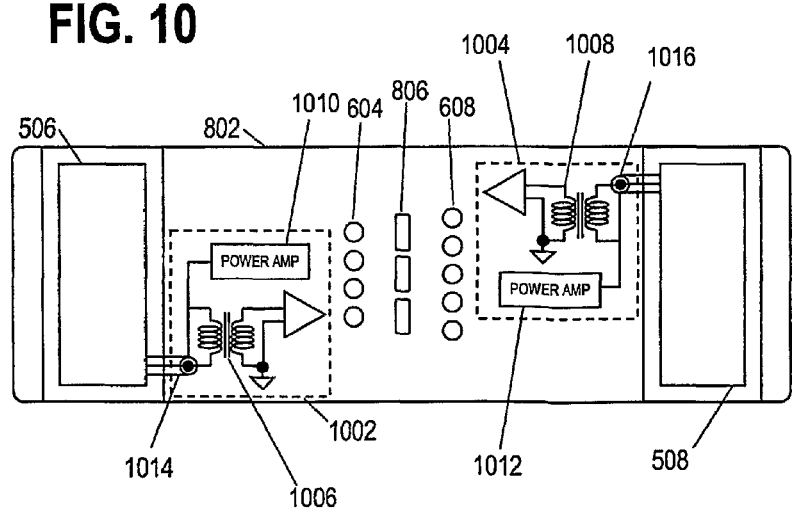
FIG. 10 shows an illustrative current sensor configuration.

In certain embodiments of the present invention, the current flowing into current electrodes 506, 508 may be measured and then used to determine the resistivity of the adjacent formation. Referring to FIG. 10, current sensors 1002, 1004 are shown. In illustrative embodiments of the present invention, current sensors 1002, 1004 include transformers 1006, 1008 that are used to assist in measuring the current associated with current electrodes 506, 508. Further, the source current is routed through power amplifiers 1010, 1012 in the present embodiment. In the illustrative embodiment, transformer 1006 is coupled between power amplifier 1010 and left current electrode 506 so that the current measurement includes only the current flowing into current electrode 506. Similarly, transformer 1008 is coupled between power amplifier 1012 and right current electrode 508 so that the current measurement includes only the current flowing into current electrode 508. Since the total current from the source is known, and the current flowing into current electrodes 506, 508 is measured, an accurate measurement of the excitation current injected into the formation is known and does not lead to a distorted calculation of formation resistivity.

When tool 34 is operated at a very low source current frequency of excitation (i.e., approximately less than 2-5 kHz), the capacitive coupling to the metal body of sensor pad 802 is negligible, meaning that the current leakage between current electrodes 506, 508 and the metal body of sensor pad 802 is very small and the measurement of excitation current injected from current electrodes 506, 508 is relatively accurate. However, the operation of tool 34 at low current frequencies results in poor accuracy when measuring borehole wall resistivity due to the low voltage difference generated between voltage electrodes 604, 806, 608. The use of higher frequencies (e.g., in excess of 5 kHz, and typically in the range of 10 kHz to 100 kHz) can provide more accurate measurements of the adjacent borehole wall resistivity, and is preferable for the measurement of low resistivity formations (i.e., less than 5 Ohm-m). An increase in the source current excitation frequency may produce a corresponding undesirable increase in current leakage from current electrodes 506, 508 to the metal body of pad sensor 802. The measurement error induced by this leakage current can be reduced by the use of guard electrodes and the method explained in the related application Ser. No. 11/421,985, entitled "OBMI Tool with Guarded Electrode Current Measurement."

Figure 11:
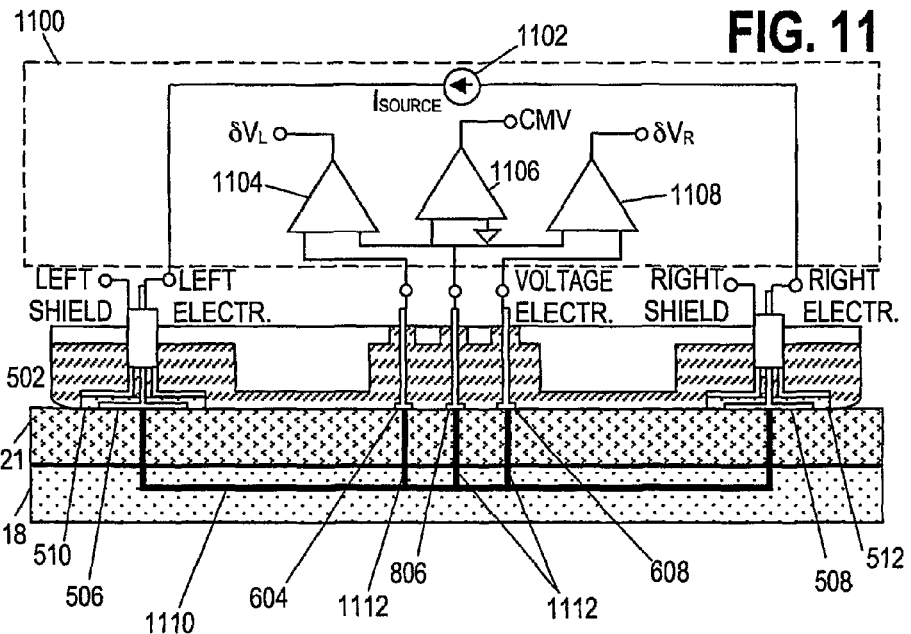
FIG. 11 shows an illustrative sensor pad circuitry configuration.

Referring now to FIG. 11, a first illustrative configuration of an oil-based mud reservoir imager (OMRI) tool is shown. Circuit 1100 represents a simplified illustration of excitation current source 1102 and differential voltage amplifiers 1104, 1108. During the use of an OMRI tool having this configuration, a significant source of error in the measurement of formation resistivity values arises from inaccuracies in the voltage measurements of tool 34 caused by the finite input impedance of the differential voltage amplifiers 1104, 1108 coupled between the shared electrode 806 and the voltage electrodes in rows 604, 608. The large but non-infinite input impedance of the differential voltage amplifiers 1104, 1108 allows a small amount of current 1112 to flow into the amplifiers electronics via voltage electrodes 604, 806, and 608.

This current flow causes a voltage drop in the mud layer 21 in front of voltage electrodes 604, 806, and 608. Since the mud layer 21 in front of each of voltage electrodes 604, 806, and 608 is not uniform, the occurrence of each voltage drop is different.

As a result, an erroneous and unwanted voltage differential is created between voltage electrodes 604, 806, and 608 and is superimposed to the voltage difference that is proportional to the resistivity of formation 18 generated by current flow 1110 that flows parallel to the surface of pad 802. This erroneous and unwanted voltage differential attributable to the finite input impedance of amplifiers 1104, 1108 is, to a first order approximation, proportional to the common mode voltage. Common mode voltage is the potential difference between the reference ground of amplifiers 1104, 1108 and the mean potential of the formation in front of voltage electrodes 604, 806, and 608. While the reference ground of amplifier 1104, 1108 is often connected to the metal body of sensor pad 802, other implementations are possible where the reference ground is offset or driven to a different potential.

The effect of this measurement error may be significant during the measurement of formations with a low resistivity (i.e., less than 5 Ohm-m) using the current injection method described above, wherein the measurement of a low voltage difference between voltage electrodes 604, 806, and 608 may be needed. In order to reduce the measurement error due to the effect of common mode voltage on the differential voltage, the common mode voltage at voltage electrodes 604, 806, and 608 is minimized in the preferred embodiments.

Figure 12:
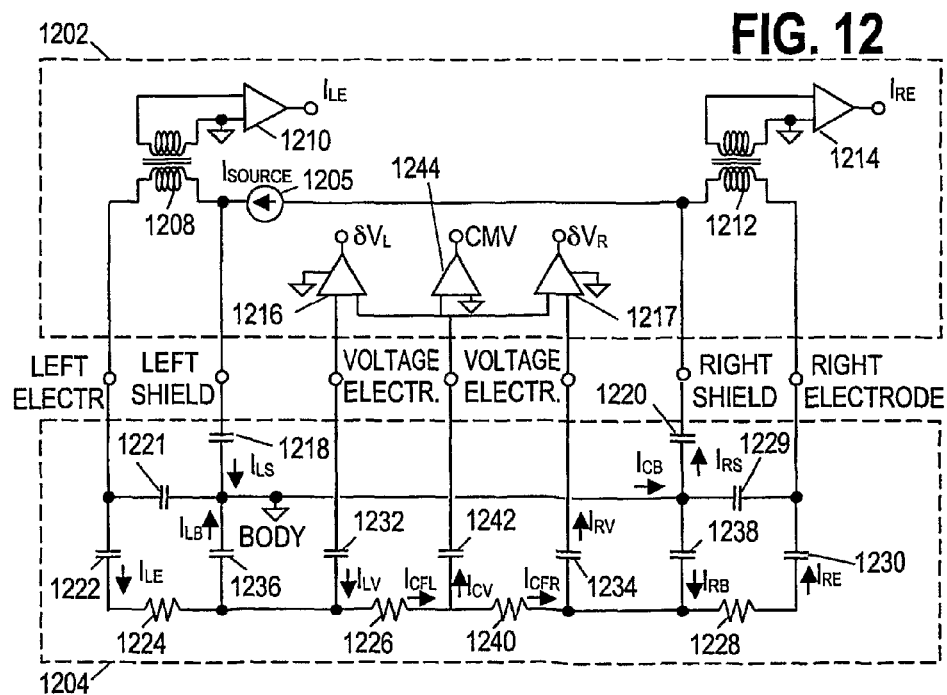
FIG. 12 shows an illustrative circuit model for the illustrative high transverse resolution sensor pad.

FIG. 12 shows an illustrative circuit model for pad 802 as it operates to measure formation resistivity. Pad 802 comprises measurement circuitry 1202 coupled to the voltage electrodes and current electrodes. The various electrodes in turn couple to the measurement environment that is modeled as an equivalent circuit 1204. Current or voltage source 1205 drives an oscillating excitation current between the current electrodes ("right electrode" and "left electrode"). Source 1205 is also coupled between the shields/guard electrodes ("right shield" and "left shield") to maintain the shields at approximately the same potential as their corresponding current electrodes. The equivalent circuit 1204 is a simplified approximation of the borehole wall's electrical characteristics, and is provided here as an aid to understanding the configuration of the measurement circuitry 1202.

Detector 1244 is utilized to measure the common mode voltage at shared voltage electrode 806. As exemplified in FIG. 8, shared voltage electrode 806 comprises multiple segments. When shared voltage electrode 806 comprises three segments, detector 1244 comprises three detectors, each detector coupled to a segment of shared voltage electrode 806, and voltage signal $V_{CMV}$ comprises the output of each detector. The output of each detector (i.e. $V_{CMV1}$, $V_{CMV2}$, $V_{CMV3}$) is sampled using an analog-to-digital converter, and the digital signals are then averaged to find the common mode voltage $V_C$ (i.e., $V_C = V_{CMV1} + V_{CMV2} + V_{CMV3})/3$). It is noted here that the common mode voltage of each shared electrode segment should be similar because the equipotential field lines are perpendicular to the current flow between the two current electrodes.

Once the common mode voltage at shared voltage electrode 806 is known, the common mode voltage at the shared electrode 806 can be minimized by the use of techniques explained in related application serial number PCT/US2006/034959, entitled "Oil Based Mud Imaging Tool with Common Mode Voltage Compensation." By minimizing the common mode voltage measured at the shared electrode 806, the common mode voltage is minimized for all the electrodes 604, 806, and 608, improving the accuracy of the measurements of the adjacent formation resistivity.

Current sensors, comprising transformers 1208, 1212 and amplifiers 1210, 1214, are coupled to the right electrode and left electrode to measure simultaneous current flows from the two current electrodes. The measured currents may be corrected to compensate for baseline current flow (i.e., the current flow that would be measured if the tool were isolated in a vacuum or in air). In some embodiments, the voltage of each current electrode (relative to the tool body) is measured and multiplied by a vacuum calibration constant to determine the baseline current from that current electrode. Note that the current electrodes may be at different voltages, causing a different baseline current to be determined for each current electrode. The corrected current values are determined by subtracting each baseline current from the measured current for the respective current electrode.

In addition to current sense amplifiers 1210, 1214 for the current measurements, measurement circuitry 1202 includes detectors 1216, 1217 for each voltage electrode to measure the potential difference generated by the formation excitation currents. Detectors 1216, 1217 may take the form of a differential voltage amplifier, and in alternative embodiments, may take the form of separate sense amplifiers for each voltage electrode. In both cases, circuitry 1202 may include analog-to-digital converters to enable digital processing of the measured potential differences. These potential differences are associated with a position on the borehole wall and processed to estimate formation resistivity at that position.

Equivalent circuit 1204 includes components 1218-1242 that approximate a theoretical current path between the current electrodes. Capacitor 1221 represents a residual capacitive coupling between the left current electrode and the pad body, and capacitor 1222 represents a capacitive coupling between the left electrode and the borehole wall. Resistors 1224, 1226, 1240 and 1228 represent resistive portions of the borehole wall. Capacitor 1229 represents a residual capacitive coupling between the right current electrode and the pad body, and capacitor 1230 represents a capacitive coupling between the borehole wall and the right electrode. Capacitors 1232, 1242, and 1234 represent capacitive couplings between the voltage electrodes and the measured portion of the borehole wall. The shields minimize direct capacitive coupling between the current electrodes and the pad body, assuming that capacitive coupling 1218 and 1220 exist. Indirect coupling is present as represented by capacitors 1236 and 1238. The currents labeled $I_{CFL}$ and $I_{CFR}$, flow through resistors 1226 and 1240 respectively, and these are the currents of interest for determining formation resistivity. Given the measured electrode currents and assuming the voltage electrode currents are minimized, it is possible to estimate the currents of interest, $I_{CFL}$ and $I_{CFR}$, and hence the resistivity of the adjacent borehole wall formation.

A processor may be provided as part of measurement circuitry 1202 to calculate resistivity values. Alternatively, current and voltage measurements may be communicated to surface computing facilities to calculate the resistivity values. The resistivity estimation can be expressed as a function:

$$R = f(\delta V, I_{LE}, I_{RE}) \tag{4}$$

where $I_{LE}$ is the current present at the left current electrode, and $I_{RE}$ is the current present at the right current electrode. The function can take a number of forms depending on experimentally measured sensor pad characteristics. In some embodiments, the resistivity estimation is the measured voltage difference divided by a weighted sum of the measured corrected electrode currents, which have been corrected through the compensation of shield leakage currents:

$$R = k\delta V / (c_0 I_{MAX} + c_1 I_{MIN}), \quad (5)$$

where k is a calibration constant based on the sensor pad geometry, $I_{MAX}$ is the greater of the corrected electrode currents, $I_{MIN}$ is the lesser of the corrected electrode currents, and $c_0$ and $c_1$ are weight factors that sum to unity. In one embodiment, the weight factors equal ½, while in another embodiment, $c_1 = \frac{2}{3}$. The weight factors may be determined in a manner that minimizes the mean square error in various calibration curves. In still other embodiments, the resistivity estimation is a weighted sum of resistivities determined for the separately measured currents:

$$R = c_0 R_{MIN} + c_1 R_{MAX} = c_0 (k\delta V / I_{MAX}) + c_1 (k\delta V / I_{MIN}), \quad (6)$$

where, again, k is a calibration constant based on sensor pad geometry, $I_{MAX}$ is the greater of the corrected electrode currents, $I_{MIN}$ is the lesser of the corrected electrode currents, and $c_0$ and $c_1$ are weight factors that sum to unity.

Figure 13:
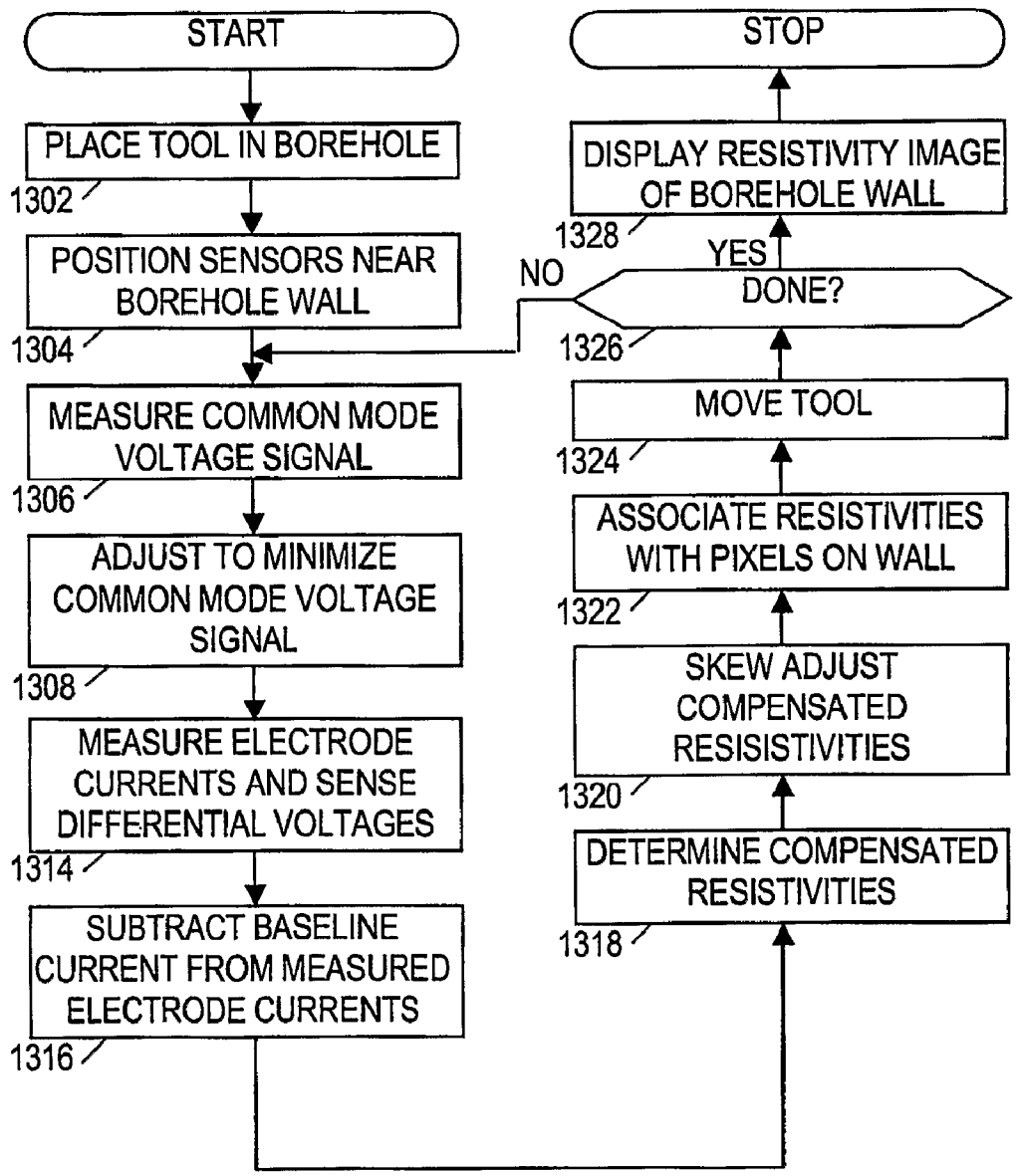
FIG. 13 shows an illustrative imaging method with high transverse resolution resistivity measurement and common mode voltage minimization.

FIG. 13 shows a flow diagram of a resistivity imaging method. In block 1302, the resistivity imaging tool is placed in a borehole. For LWD, the tool is part of the bottom hole assembly to perform logging as drilling operations are performed. For wireline logging, the tool is part of a sonde that is lowered to the bottom of the region of interest to perform logging as the logging tool is pulled uphole at a steady rate.

In block 1304, the tool is placed in logging mode. For LWD, this operation may (or may not) involve deploying a de-centralizer that forces sensors in the tool body against the borehole wall. Alternatively, the LWD resistivity imaging tool may have one or more sensor pads that are deployed against the borehole wall. For wireline logging, multiple sensor pads are deployed against the borehole wall.

Blocks 1306-1326 represent operations that occur during the logging process. Though shown and described in a sequential fashion, the various operations may occur concurrently, and moreover, they may simultaneously occur for multiple voltage electrodes and multiple sensor pads.

In block 1306, the tool measures the potential difference between the formation and the differential voltage amplifier reference ground, referred to as the common mode voltage signal. In block 1308, a check of the common mode voltage measurement is performed to determine if the common mode voltage signal is within a limit acceptable to gathering accurate differential voltage measurements from the formation. If the common mode voltage signal is not within acceptable limits, tool operation parameters, such as the magnitude of excitation current amplitude and/or phase, are adjusted to bring the common mode voltage signal within limits acceptable for formation resistivity imaging.

Once the common mode voltage is determined to be within an acceptable limit, in block 1314 the tool measures the currents through the two current electrodes, and further measures the voltage difference between the various voltage electrode pairs in this step. In block 1316, the tool determines a compensated resistivity measurement for each voltage electrode pair in accordance with one of equations (4), (5), or (6).

In block 1320, resistivity measurements associated with the electrodes on either side of the shared electrode are skew adjusted to compensate for the different longitudinal positions of the electrodes when voltage measurements were performed. Skew adjustment may be performed, for example, by associating measurements taken from the voltage electrodes on one side of the shared electrode with measurements taken at the same longitudinal borehole position from the voltage electrodes on the opposite side of the shared electrode. Alternatively, measurements taken from voltage electrodes on either or both sides of the shared electrode may be interpolated to estimate the resistivity value at any longitudinal borehole position.

In block 1322, the tool, or more likely, the surface logging facility coupled to the tool, associates the compensated and de-skewed resistivity measurements with a tool position and orientation measurement, thereby enabling a determination of borehole wall image pixel values. In at least some embodiments, a borehole wall image is displayed in real time while the logging process is ongoing.

In block 1324, the tool moves along the borehole, and in block 1326, a check is performed to determine whether logging operations should continue (e.g., whether the logging tool has reached the end of the region of interest). For continued logging operations, blocks 1306-1326 are repeated. Once logging operations are complete, the surface logging facility may process the resistivity and position measurements to generate and display a refined resistivity image of the borehole wall in block 1328.

A variety of voltage electrode geometries are possible and may be used. A greater number of voltage electrodes may provide higher resolution at the expense of increased processing costs. In such arrangements, it is contemplated that the common mode voltage to be minimized will be the average of voltage signals from all segments of a shared voltage electrode. The operating voltages and currents may vary widely while remaining suitable for the logging operations described herein. It has been found that source current frequencies above about 5 kHz, and perhaps as high as 100 kHz or more, are desirable as they reduce the mud layer impedances and increase the voltage differences measurable between the voltage electrodes. In some tool embodiments, the source current frequency may be switchable between low frequency (e.g., 10 kHz) and high frequency (e.g., 80 kHz) for measurements in formations of differing resistivity. Higher frequencies may be preferred for formations having a generally lower resistivity, and vice versa.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Accordingly, the scope of protection is not limited to the embodiments described herein, but is only limited by the claims which follow, the scope of which shall include all equivalents of the subject matter of the claims.

What is claimed is:
1. An oil-based mud imaging tool that comprises:
    at least two longitudinally-spaced current electrodes to create a current flow in a borehole wall;
    a first row of laterally-spaced voltage electrodes; and
    a shared voltage electrode longitudinally spaced from said row, wherein for each voltage electrode in said row, the tool measures a voltage relative to the shared voltage electrode, wherein said voltages result from said current flow, and wherein the shared voltage electrode has a larger lateral dimension than the voltage electrodes in said first row.

2. The tool of claim 1, further comprising:
a second row of laterally-spaced voltage electrodes, wherein the electrodes in said second row are laterally offset from electrodes in said first row, and wherein for each voltage electrode in said second row, the tool measures a voltage relative to said shared voltage electrode.

3. The tool of claim 1 wherein:
said shared voltage electrode longitudinally separates said first row of electrodes from said second row of electrodes.

4. The tool of claim 1, wherein:
said shared voltage electrode comprises a plurality of voltage electrodes.

5. The tool of claim 1 wherein:
the at least two current electrodes are energized by an excitation source to create an oscillatory electric field in a borehole wall.

6. The tool of claim 1 further comprising:
voltage detectors coupled to said shared voltage electrode and to each voltage electrode in said row to measure a voltage for each voltage electrode in said row relative to the shared voltage electrode.

7. The tool of claim 6, wherein:
the voltage detector is a differential voltage amplifier.

8. The tool of claim 6, further comprising:
at least two current sensors coupled between the at least two current electrodes to measure a current flow.

9. The tool of claim 8, further comprising:
a circuit in communication with said first current sensor, said second current sensor and said voltage detectors to determine a resistivity value from said first current flow, said second current flow and said voltage.

10. The tool of claim 1 further comprising:
at least one voltage detector coupled to said shared voltage electrode to measure a common mode voltage; and
a circuit coupled to said at least one voltage detector to minimize the common mode voltage.

11. The tool of claim 10, wherein:
the voltage detector is a differential voltage amplifier.

12. A logging method that comprises:
creating an oscillatory electric field in a borehole wall using at least two current electrodes driven by an excitation source;
measuring a first differential voltage between a shared electrode and each of a first row of voltage electrodes; and
measuring a second differential voltage between said shared electrode and each of a second row of voltage electrodes.

13. The method of claim 12 wherein:
said first row of voltage electrodes and said second row of voltage electrodes are separated by said shared electrode.

14. The method of claim 12 wherein:
said first row of voltage electrodes and said second row of voltage electrodes are laterally offset.

15. The method of claim 12 further comprising:
measuring a current flow to a first of said at least two current electrodes; and
determining resistivity values using said measured current flows and said measured differential voltages.

16. The method of claim 15 further comprising:
correlating said resistivity values with positions on the borehole wall and displaying a borehole wall image that represents at least the positions on the borehole wall associated with said resistivity values.

17. The method of claim 16 wherein correlating the resistivity values with positions on the borehole wall comprises:
aligning said resistivity values determined from said first differential voltages with said resistivity values determined from said second differential voltages to produce high lateral resolution resistivity values.

18. The method of claim 17 wherein aligning said resistivity values comprises:
retrieving from a storage device, said resistivity values corresponding to a borehole wall position.

19. The method of claim 18 wherein aligning the resistivity values comprises:
determining an resistivity value corresponding to a borehole wall position by interpolating said resistivity values.

20. The method of claim 12 further comprising:
measuring a common mode voltage for said shared electrode relative to a pad ground.

21. The method of claim 20 further comprising:
minimizing the common mode voltage measured for said shared electrode.

* * * * *